United States Patent [19]

Grabovac et al.

[11] Patent Number: 4,802,540
[45] Date of Patent: Feb. 7, 1989

[54] ELECTRONIC WEIGHING SCALES

[75] Inventors: Bosko Grabovac, Arcadia; Zlatko Kurtovic, Walnut, both of Calif.

[73] Assignee: Consolidated Devices Inc., City of Industry, Calif.

[21] Appl. No.: 150,034

[22] Filed: Jan. 29, 1988

[51] Int. Cl.[4] .................... G01G 3/14; G01G 21/28; G01L 1/22

[52] U.S. Cl. .................................... 177/211; 177/238; 73/862.65

[58] Field of Search ................. 177/147, 211, 238; 73/862.65

[56] References Cited

U.S. PATENT DOCUMENTS

| | | |
|---|---|---|
| 2,414,161 | 1/1947 | Moore ............................ 73/862.65 |
| 2,428,012 | 9/1947 | Collins et al. . |
| 2,447,566 | 8/1948 | Decker et al. . |
| 2,576,417 | 11/1987 | Ruge ............................ 73/862.65 |
| 2,582,886 | 1/1952 | Ruge ............................ 73/862.65 |
| 2,943,480 | 7/1960 | Nelting . |
| 3,105,564 | 10/1963 | Ormond . |
| 3,201,982 | 8/1965 | Kennedy . |
| 4,523,653 | 6/1985 | Scrivener et al. ............... 177/147 |

Primary Examiner—George H. Miller, Jr.

[57] ABSTRACT

A weighing scales structure comprising an elongate unitary tension rod having an elongate reaction end portion with inner and outer ends and a force-transmitting coupling part at its outer end, an elongate working end portion with inner and outer ends and a force-transmitting coupling part at its outer end, a central elongate elastic portion extending between and integrally joined with the inner end portions of the reaction and working portions; and, a plurality of strain gauges fixed to the elastic portion. The scales next include an elongate housing freely engaged about the central elastic portion and the inner end of the working end portion and releasably clampingly engaged with and about the inner end portion of the reaction portion. A circuit board and a battery power supply are mounted within the housing. The circuit board carries a bridge circuit in which the strain gauges are connected and a light emitting digital readout device which is visible through a window in the housing.

16 Claims, 3 Drawing Sheets

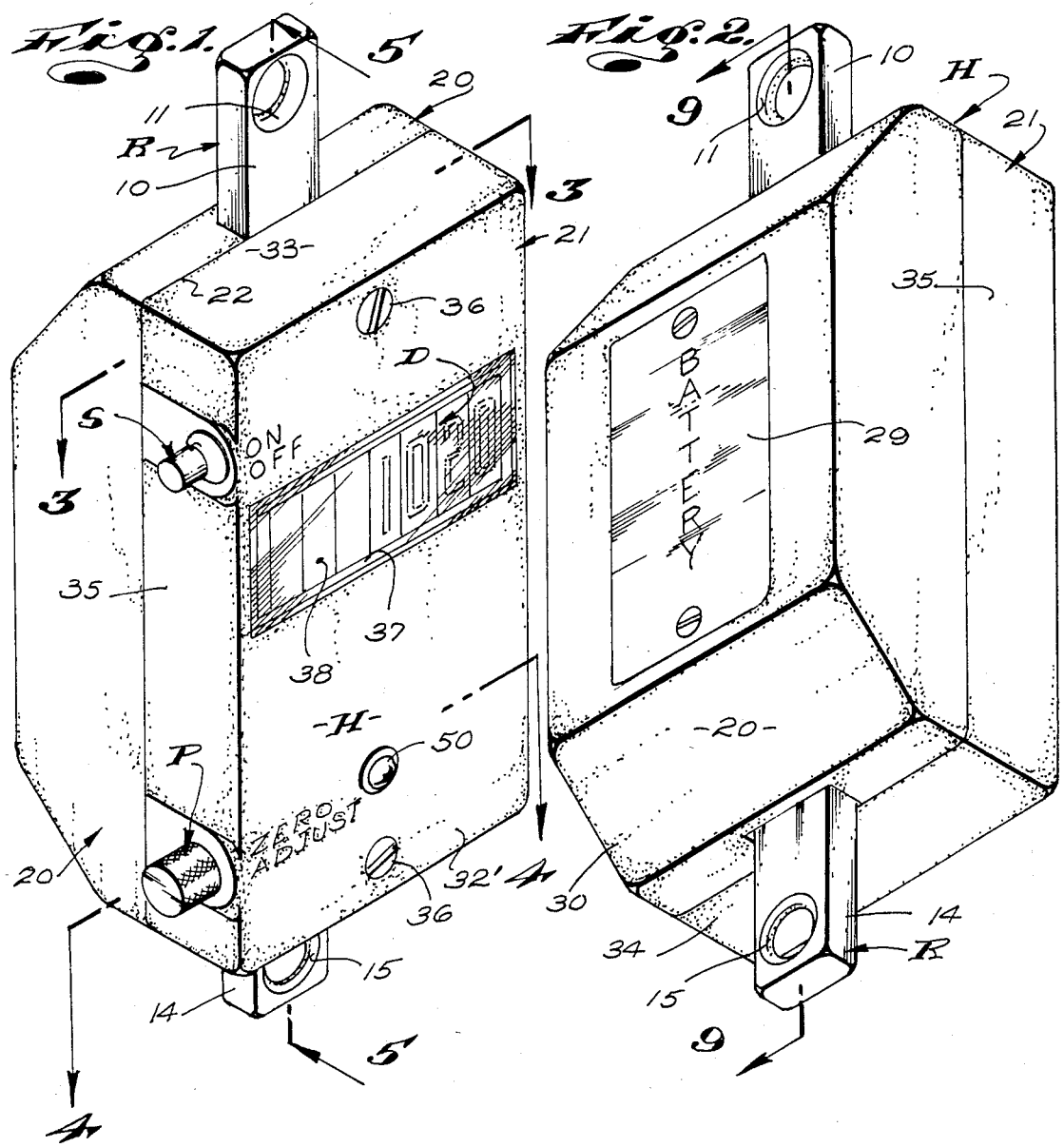
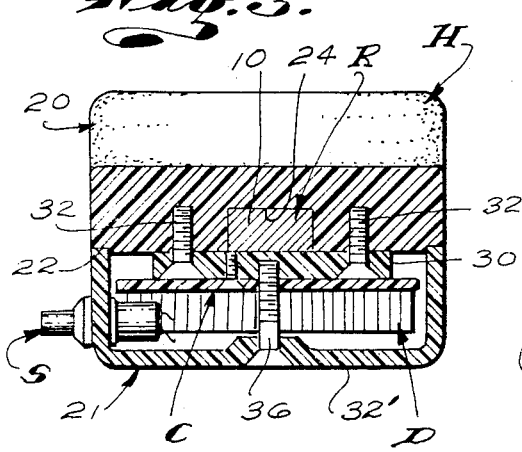
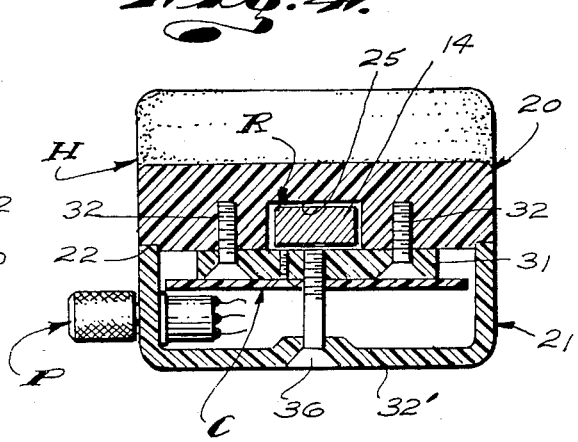

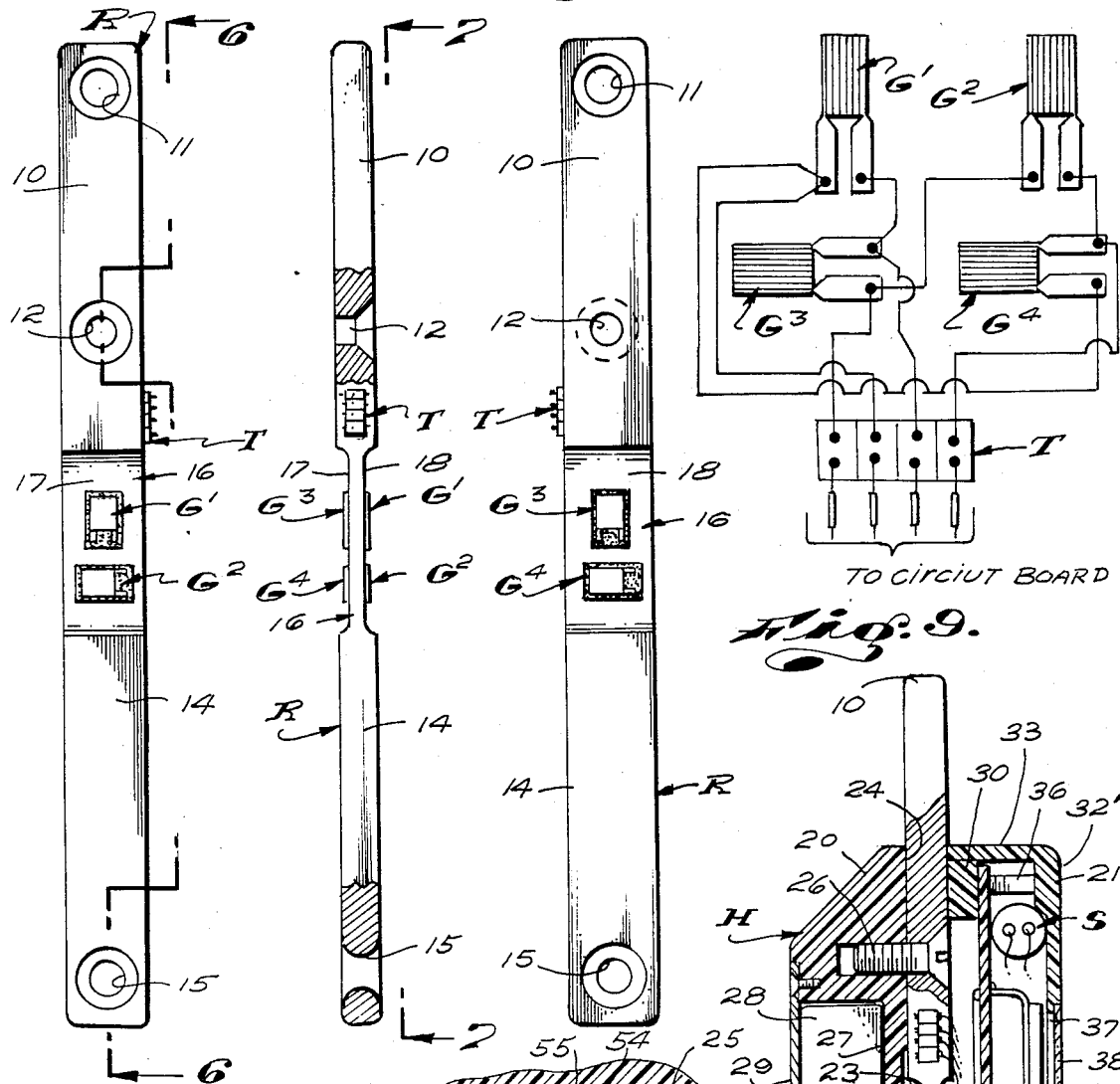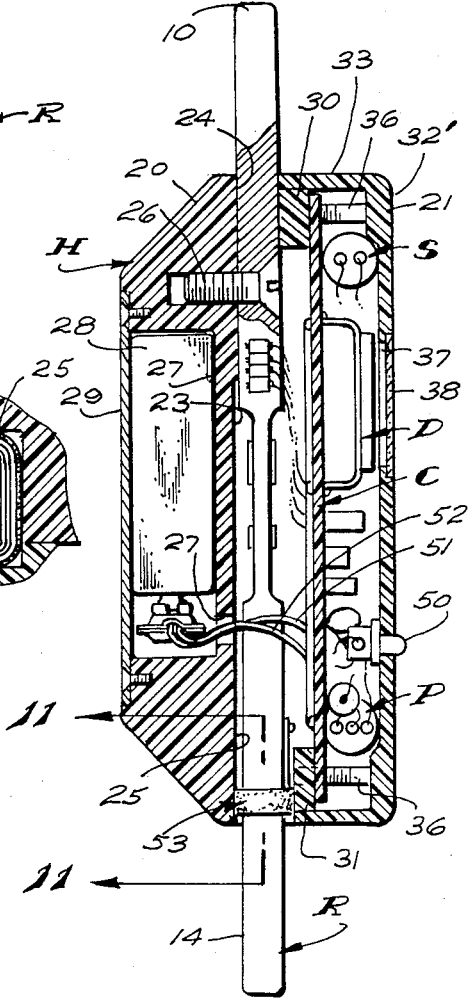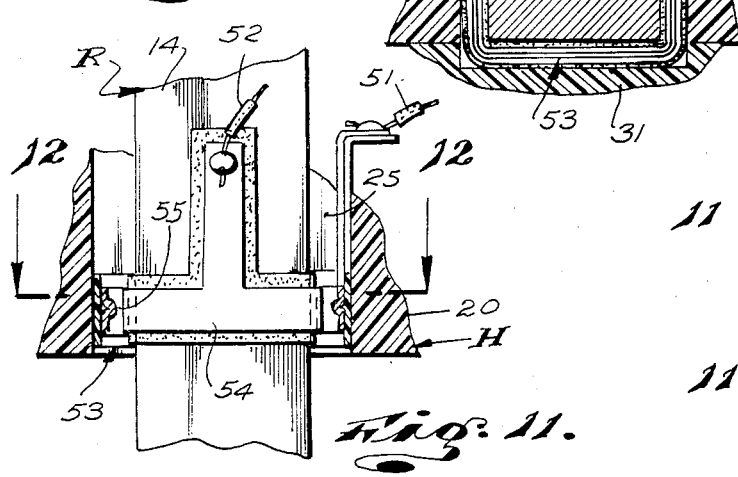

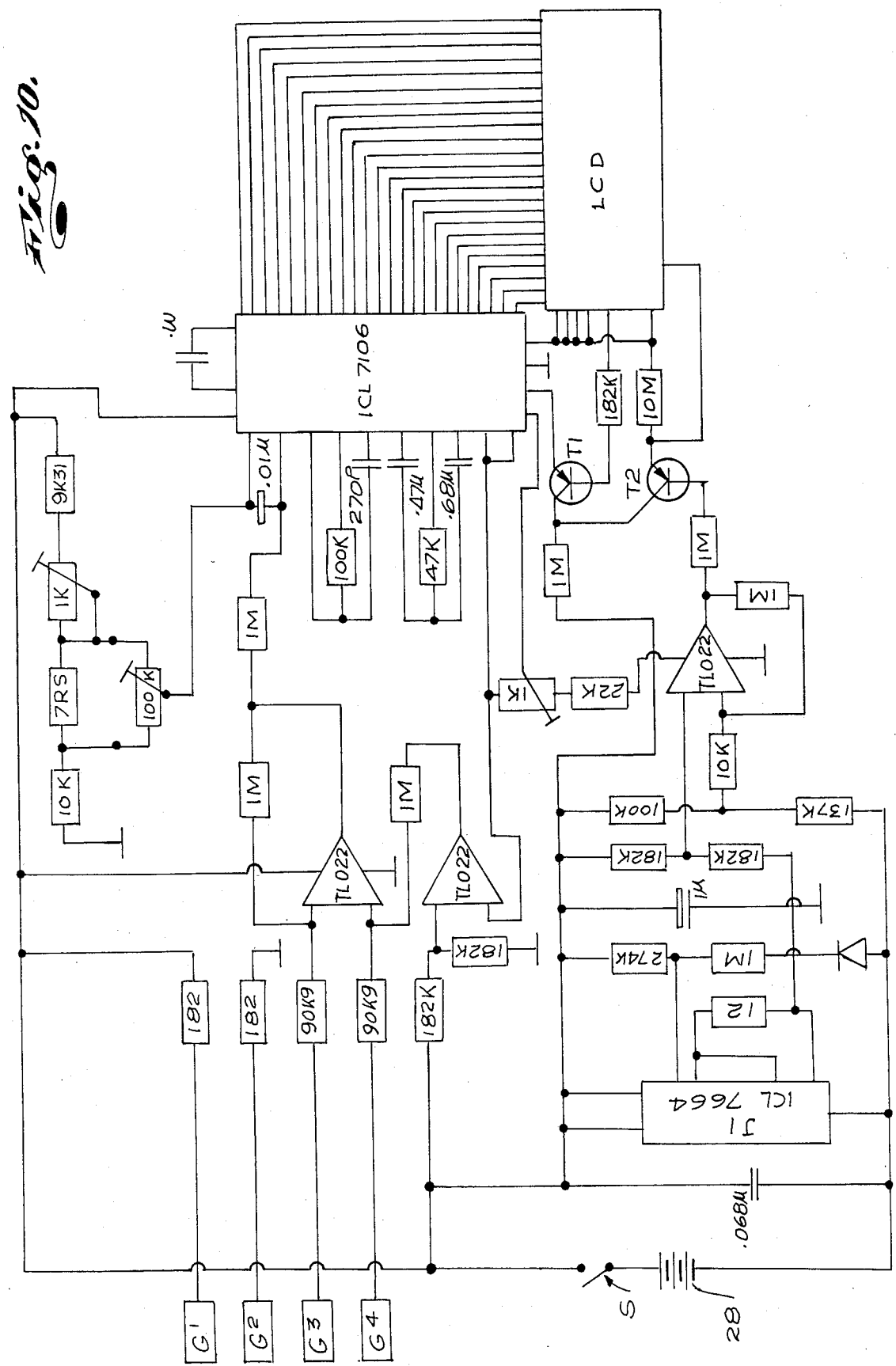

ELECTRONIC WEIGHING SCALES

BACKGROUND OF THE INVENTION

Throughout the arts, it is old and common practice to ascertain the weight of objects and to determine forces exerted through and between related objects by weighing scales that translate and visibly display the weights and forces encountered in terms of, for example, pounds and fractions thereof.

For many years, weighing scales have utilized various forms of springs and related mechanical mechanisms through which encountered forces are directed and which include readout devices, often with dial faces and pointers, which serve to translate the amount of elongation or deflection of the springs into corresponding weight or force measurements. Other common scale structures include pivotally supported balance beams and counterweights with related structure to effect transmitting the weight of objects or of forces encountered onto the balance beams. The beams of such scales are calibrated and the counterweights are movable relative thereto and serve as markers to indicate the weight or forces encountered.

The great majority of the above noted common and familiar forms of scales are, by today's standards, inaccurate and unreliable. Further, due to the structural requirements and limitations embodied in those scales structures, they are frequently too large for use in many situations where space is at a premium and/or are so constructed and operate in such a manner that they cannot be effectively disposed and related to objects to be weighed or to related objects between which forces to be measured are encountered.

In recent years, with the advent of resistance-type strain gauges that are effective to measurably respond to slight displacement of the metal of metal parts to which the gauges are fixed and with the more recent advent of highly sophisticated bridge circuits which are effective to compensate for variations and/or deviations encountered in the resistance afforded by strain gauges, the prior art now provides electronic weighing and force-indicating scales wherein the weight of objects or forces to be measured are transmitted onto and through metal torque beams or tension rods on which strain gauges are fixed and which include electronic circuits to which the strain gauges are connected and which operate to accurately translate slight weight or force-induced movement and/or deflection of the beams and/or rods, sensed by the strain gauges, into electrical signals that are in turn translated into readable weight or force measurements by suitable electronic readout devices.

To date, to the best of our knowledge and belief, electronic weighing scales and the like which are provided by the prior art and in which strain gauges are utilized to sense and respond to the movement or displacement of a metal part in and through which weight and forces to be measured are conducted, are highly specialized, complicated and very costly scales or weighing structures.

To the best of our knowledge and belief, those prior art electronic weighing structures of the character referred to above are found embodied in large, complicated and costly structures and mechanisms such as bulk weighing scales, truck weighing scales, dynamometers, and the like. Apart from the foregoing, the prior arts use of strain gauges to measure forces is understood and believed by Applicants to be substantially limited to the application of such gauges in selected parts of pre-existing machines and devices where, for the purpose of controlling the operation of those machines and devices, it is desirable to know what the forces directed onto and through those selected parts are or might be.

To the best of our knowledge and belief, the prior art has not sought to provide a small, lightweight, compact electronic weighing scales structure which is suitable for regular or universal use in the great majority of those situations where old-fashioned spring-type scales or balance beam scales have long been used.

OBJECTS AND FEATURES OF OUR INVENTION

It is an object of our invention to provide a new and improved manually portable electronic weighing scales which is particularly suited for use wherever common spring-type scales have been and are commonly used.

It is an object and feature of our invention to provide a scales of the general character referred to above which includes a single, elongate, unitary metal load-conducting rod with opposite reaction and working end portions with coupling parts at their outer free ends, an elastic central portion of reduced cross-section; strain gauges fixed on the central portion of the rod; an elongate, manually-engageable housing with one end releasably mounted on the reaction portion of the rod longitudinally inward of the outer free end thereof, its other or opposite end freely engaged about the working end portion of the rod longitudinally inward of the outer free end thereof, a central portion freely accommodating the central portion of the rod; a battery powered bridge circuit mounted within the housing and connected with the strain gauges and an electronic digital readout device connected with the bridge circuit within the housing and visible through a window in the housing.

It is an object and feature of our invention to provide a scales of the general character referred to wherein the rod is sufficiently strong and rigid so that with its central and working end portions project freely through and are not normally subject to being deflected laterally within the housing, from its reaction portion which is securely mounted in the housing.

It is an object of our invention to provide a scales structure of the general character referred to above wherein the bridge circuit has a related manually operable adjusting device for adjusting the circuit to compensate for thermal expansion and contraction of the central portion of the rod and to zero or null the readout device when the scales structure is put to use.

Another object and feature of our invention is to provide a scales structure of the general character referred to wherein the housing is made of a strong and durable plastic material having a low index of heat conductivity and so encloses the major portion of the rod and the other parts and portions of the scales structure so that thermal expansion and contraction of the central portion of the rod and of the strain gauges is slowed to an extent that an accurate reading of the weight of an object being weighed can normally be obtained before thermal expansion or contraction of the central portion of the rod and/or strain gauges adversely alters the zero setting or nulling of the scales.

Yet another object and feature of our invention is to provide a light emitting warning circuit to signal and alert a user of the scales structure that forces are being improperly directed through it and that the accuracy of the scales might therefore be impaired.

Still another object and feature of our invention is to provide a novel scales structure of the general character referred to above which need not be greater than 6 inches in overall longitudinal extent, 2¼ inches by 2 inches in cross-sectional extent and 1 pound in weight.

It is an object and feature of our invention to provide a scales structure of the general character referred to above which is such that it can be simply and quickly adjusted and made to accurately weigh objects and measure tensile forces throughout any desired range of weights and forces that are less than the tensile limits of the central portion of the rod.

An object and feature of our invention is to provide a scales of the general character referred to which is dynamically stable and is not subject to dynamic fluctuations such as characterizes spring scales and so that accurate, stable readings of weights and forces are attainable substantially instantaneously. That is, there is no requirement to wait and let the scales come to rest, as it is in the case of spring and balance scales structures, before a measurement can be made.

Finally, it is an object and feature of our invention to provide a scales of the general character referred to including a small number of easy and economical-to-make and assemble parts and components whereby the scales lends itself to being mass produced and marketed at low cost and is such that it can be easily, quickly and economically serviced and repaired, if circumstances require.

The foregoing and other objects and features of our invention will be apparent and will be understood upon reading the following detailed description of one typical preferred form and embodiment of our invention throughout which description reference is made to the accompanying drawings.

DESCRIPTION OF THE DRAWINGS

FIG. 1 is an isometric view showing the front, top and one side of our new scales structure;

FIG. 2 is an isometric view showing the back, bottom and other side of our new scales structure;

FIG. 3 is a cross-sectional view taken substantially as indicated by line 3—3 on FIG. 1;

FIG. 4 is a cross-sectional view taken substantially as indicated by line 4—4 on FIG. 1;

FIG. 5 is an elevational view of the tension rod and is taken substantially as indicated by line 5—5 on FIG. 1;

FIG. 6 is a view taken substantially as indicated by line 6—6 on FIG. 5;

FIG. 7 is a view taken substantially as indicated by line 7—7 on FIG. 6;

FIG. 8 is a diagramatic view of the strain gauge circuit that we provide;

FIG. 9 is a cross-sectional view taken substantially as indicated by line 9—9 on FIG. 2;

FIG. 10 is a diagramatic view of the bridge circuit utilized in carrying out our invention;

FIG. 11 is an enlarged, detailed sectional view of a portion of our scales structure; and FIG. 12 is a view taken substantially as indicated by line 11—11 on FIG. 10.

DETAILED DESCRIPTION OF THE INVENTION

In the accompanying drawings, we have shown our invention in that form which has developed from the making of several prototype scales and which has been adopted and is now being produced in limited numbers. The overall length or vertical extent (6½ inches) of the scales illustrated was arrived at in light of practical considerations and is, to a great extent, arbitrary. The lateral extent (2½ inches) of the box-like housing was dictated by the size and/or lateral extent of a light-emitting diode readout device we have elected to use and the circuit board which carries that device. In practice, by adopting and using a smaller readout device, the lateral extent of the housing could be reduced substantially. The depth (2 inches) of the housing was dictated by the dimensions of the 9 volt battery we elected to use to power the scales and by the depth of the above noted readout device. Accordingly, by using a smaller readout device and by rearranging or using different batteries or cells, the depth of the housing might be reduced substantially. In spite of the generous dimensions utilized, it will be apparent that the 6½ inches by 2½ inches by 2 inches scales is quite small and is such that it can be easily and most conveniently held and manipulated in one hand of the user.

Structurally, the whole of the scales is built upon and about a unitary tension rod R. The rod R is illustrated separately in FIGS. 5, 6 and 7 of the drawings. The rod R is made of a suitable, high quality, heat-treated steel alloy. It is established from rectangular bar stock with flat front and rear surfaces and flat oppositely disposed side edges.

As illustrated, the bar is arranged vertically and has an upper reaction portion 10 with an upper outer free end portion and an inner end portion. The outer free end portion is formed with a forwardly and rearwardly opening through-opening 11 which is a coupling part. That is, it is an opened or apertured part in and through which a hook, bar, or other complimentary coupling part can be engaged to effect coupling of the reaction portion of the rod to other structure, to support or anchor it, as desired or as circumstances require.

The inner end portion of the reaction portion 10 is formed with a forwardly and rearwardly opening screw fastener receiving opening 12 to facilitate screw fastening in and anchoring the rod in and with a housing structure H of the scales, as will hereinafter be described.

The rod R next has a lower working portion 14 with a lower outer free end portion and an upper inner end portion. The outer free end portion is formed with an opening 15 which, like the opening 11 in the reaction portion 10, establishes a coupling part.

Finally, the rod R has an elongate vertically extending central portion 16 of reduced thickness so as to weaken and thereby impart it with greater elasticity than the portions 10 and 14. That is, the central portion 16 is made thinner so that when the rod is subjected to tensile forces, between its opposite ends, the portion 16 will readily stretch within the elastic limits of the material of which the rod is made, while the end portions 10 and 14 of the rod are left sufficiently strong so that they will not stretch to any appreciable extent under normal operating conditions.

The central portion 16 of the rod is reduced in thickness by suitably milling the front and rear surfaces of the bar stock from which the rod is made, during manufacture of the rod. The portion 16 is made to define and has flat front and rear surfaces 17 and 18, as clearly shown in the drawings.

Our structure next includes four like elongate strain gauges $G^1$, $G^2$, $G^3$, and $G^4$. The strain gauges $G^1$ and $G^2$ are arranged with their axes at right angle to each other and are fixed on the front surface 17 of the central portion 16 of the rod. The gauges $G^3$ and $G^4$ are similarly arranged and are fixed to the rear surface 18 on the rod. In the preferred carrying out of our invention and as shown, a terminal strip 19 is fixed to one side edge of the upper portion 10 of the rod R.

The noted strain gauges $G^1$ through $G^4$ and the terminal strip 19 are interconnected by conductor lines, as shown in the diagram in FIG. 8 of the drawings. The conductor lines (not shown in FIGS. 5, 6 and 7) are bonded within a thin, dielectric protective coating applied to their adjacent portions of the rod.

It will be apparent that the rod R is an extremely simple part which is easy and economical to make. It will also be apparent that the rod is such that the work of applying the noted strain gauges, terminal strip and their related conductor lines to the rod is work performed where free and open access to the rod is afforded and can be done easily, quickly and economically.

Our scales structure next includes our above-referred-to housing H. The housing H is fixed to and carried by the upper reaction portion 10 of the rod R and houses the inner end portions of the reaction and working portions 10 and 14 of the rod, the central portion 16 of the rod and the strain gauges, terminal strip, and conductor lines that are fixed to and carried by the rod. The housing also accommodates other parts and portions of our structure which will hereinafter be described.

The housing H is a 2-part structure, there being a rear part or body 20 and a front part or cover 21. The body has a flat front surface 22, a central forwardly opening cavity 23 to freely accommodate the central portion 16 of the rod R, and has elongate central, vertically-extending, vertically and forwardly-opening upper and lower channels 24 and 25. The upper channel 24 is substantially equal in cross-sectional dimensions to the cross-sectional dimensions of the upper reaction portion 10 of the rod R and closely or snuggly receives that portion of the rod. The lower channel 25 is slightly greater in cross-sectional dimension than the cross-sectional dimensions of the lower working portion 14 of the rod and freely accommodates that portion of the rod with working clearances.

The upper reaction portion 10 of the rod R is releasably fastened in the channel 24 and with the body 20 of the housing by a screw fastener 26 engaged in and through the opening 12 in the rod and into the body 20, as clearly shown in FIG. 9 of the drawings.

The channels 24 and 25 and the rod R are aligned so that the lower working portion of the rod is normally aligned in the channel 25 with free working clearance established between the rod and the body. The rod is not so soft and/or flexible that it will bend, twist or otherwise move from alignment within the channel 25 during normal operation and use of the scales. The clearances provided for the rod within the channel 25 are such that if the rod is forced out of alignment, the body defining the channel 25 stops and limits lateral deflection of the rod before the elastic limits of the material of which the rod is made is reached. Accordingly, damage to the rod as a result of lateral flexing, twisting or other working thereof is effectively guarded against and/or prevented.

In addition to the foregoing, the body 20 of the housing has a rearwardly opening battery-receiving recess 27 in which a battery 28 is positioned. The recess 27 is normally closed and the battery 28 is retained therein by a cover plate 29 that covers the opening rear of the cavity and which is screw-fastened to the body, as shown.

Finally, the body 20 is formed with a through-opening 27' between the recess and the cavity therein and through which electric power lines extending from the terminals of the battery extend.

Our scales structure next includes upper and lower keeper bars 30 and 31 overlying and closing the open fronts of the channels 24 and 25. The bars 30 and 31 are elongate horizontal unitary parts that extend transverse the front surface of the body 20 and have central portion overlying their related channels 24 and 25 and their related portions 10 and 14 of the rod R as clearly shown in FIGS. 3, 4 and 9 of the drawings.

The bars 30 and 31 have opposite end portions that are releasably fixed to the housing by screw fasteners 32. The central portion of the upper keeper bar preferably engages and holds the portion 10 of the rod R clamped tight in the channel 24 while the central portion of the lower keeper bar is relieved and spaced from its related working portion 14 of the rod R. The central portions of the keeper bars 30 and 31 can be specially formed to effect their above noted relationship with their related portions of the rod, as desired or as circumstances require. In practice, the tolerances of the manufactured parts of the scale are such that the desired relationship between the parts can be effected by suitably dressing down the keeper bars with a file.

When mass producing the scales, the tooling for the parts thereof can be easily made and/or corrected so that no need for hand working of the parts is left to remain.

The cover 21 of the housing is a rearwardly opening box-like unit with a flat front wall 32' and top, bottom and side walls 33, 34 and 35. The top, bottom and side wall have rear edges that oppose and establish flat seated engagement with the perimeter edge portion of the front surface of the body 20, as clearly shown in the drawing. The cover 21 is releasably screw fastened to the body 20 by screw fasteners 36 engaged through the front wall 32' and into the upper and lower keeper bars, as shown.

The front wall 32' of the cover has a window opening 37 which is closed by a transparent pane 38. One of the side walls 35 is provided with lateral through-openings or ports to accommodate an on and off switch unit S and a manually-operable variable resistance unit or potentiometer P for the electrical means of our scales. In practice, the positioning of the noted ports in the housing structure can be varied widely, as desired and as circumstances require.

The body and cover 30 and 31 of the housing H are preferably molded of a strong, durable plastic material having a low index of heat conductivity whereby the housing is an effective thermal heat-insulating structure for and about the rod R and the other parts and means of our scales.

While the keeper bars are, to date, metal parts, it is contemplated and it will be apparent that they can be established of plastic and can be formed interedly with and made portions of the cover 21, without departing from the broader aspects and spirit of our invention. If such a modification is made, the number and arrangement of screw fasteners 26, 32 and 36 would be suitably altered.

Our scales structure next includes a flat, vertical circuit board C with flat front and rear surfaces. The board C is positioned freely within the cover 21 of the housing H. The board C has upper and lower end portions supported on and screw fastened to the keeper bars 30 and 31. The board C carries a suitable circuit which includes one or more bridges and is connected with the resistance strain gauges $G^1$ through $G^4$ in such a manner that the gauges serve as desired resistance elements in the bridge or bridges. The circuit can vary widely in structural detail and can vary substantially in functional details without departing from the broader aspects and spirit of our invention. In practice, we have used several different bridge circuits which attained satisfactory and acceptable end results. Those circuits had characteristics and features which are found in and characterize that bridge circuit which is the subject matter of and is disclosed in U.S. Pat. No. 4,522,075 for "TORQUE WRENCH", issued June 11, 1985 to Peter Pohl. That is, the circuits we have used and which have been found to be suitable in carrying out our invention are essentially the same as the noted patented circuit, with some variations. The circuit or circuits used in carrying out our invention are purchased components, made to our order by another who has expertise in electronics. We do not have sufficient expertise with respect to the circuit to offer a full and meaningful disclosure of the circuit and have, therefore, elected to show the basic bridge diagram in FIG. 10 of the drawings, for the purpose of disclosing our new scales structure.

For the purpose of this disclosure, it will suffice to note that the battery 28 is the power source for the circuit that we employ. An on and off switch S carried by the housing controls the flow of power between the battery and the circuit. A manually-operable, variable resistance or potentiometer P carried by the housing is connected in the circuit and is operated to zero out or null the circuit to compensate for thermally responsive variations in the circuit output and to compensate for pre-loading of the scale.

In accordance with the above, the circuit includes a liquid crystal digital readout device D. The device D is carried by the board C and is arranged in the cover rearward of the window 37 and so that it can be easily and conveniently viewed and read through that window.

In FIGS. 11 and 12 of the drawings, we have shown an added feature which is believed to be extremely important when and if the scales that we provide are put into general use and into the hands of persons with questionable knowledge and skills as to how the scales operates and must be used to attain accurate results. In the use of our scales, the most likely cause for attaining inaccurate or false readings is the misalignment of applied forces which manifest themselves in bending or twisting the central portion 16 of the rod and in resulting lateral displacement of the lower working portion 14 of the rod. To advise and/or signal the user of the scales that forces are being improperly directed through the scales and that an accurate reading is not likely to be attained, we provide an indicator lamp (red) 50 in and visible at the front wall of the housing cover. The lamp 50 is suitably connected with the terminals of or with power lines extending from the battery 28 by lines 51 and 52. A normally open switch structure 53 is engaged in the line 52. The switch structure 53 includes an inner rectangular contact ring 54 about and carried by the lower working portion 14 of the rod, within the channel 25, and is connected with the power line 52 that extends to the lamp. The switch structure 53 next includes an outer rectangular contact ring 55 mounted within the channel 25 of the body in spaced relationship about the inner contact ring and is connected with the line 51 which extends to and is directly or indirectly connected to the battery. The gap between the inner and outer rings is limited so that the inner ring is moved into contact with the outer ring and closes the switch if and when the lower working portion of the rod is laterally displaced, in any direction, a sufficient distance to result in adverse distortion of the central portion 14 of the rod and malfunctioning of one or more of the strain gauges therein. Thus, if the lamp 50 is energized or on, the operator of the scales is warned that the scales is improperly disposed or misaligned with related work and that a proper reading of weight or force might not be attainable.

It is important that the lamp 50 be operated independent of the operating circuit for the scales and that said operating circuit not be shut off each time the lamp is energized. The lamp might be on for but an instant and may simply flicker, in which case, an accurate reading can be reasonably assured. If the switch structure 53 were made to shut off the circuit for the scales, the attaining of an accurate reading would be notably delayed and the operator would be greatly inconvenienced since, upon de-energizing and re-energizing the circuit for the scales, a notable delay occurs before the circuit is fully operational.

In operation and use of our scales, the lower working end portion of the rod is connected with the load to be weighed. The scales is then turned on and, by means of the potentiometer P, is nulled or zeroed out. Thereafter, the housing H can be manually gripped and elevated to lift and to thereby weigh the load. Alternatively, if the load to be weighed is to be placed in a container or carrying gear, the container or carrying gear is first connected with the working portion of the rod and the scales and container or carrying gear is elevated. With the scales and container or carrying gear elevated, the scales is nulled or zeroed out. Thereafter, the load is placed in the container or carrying gear and its weight is accurately indicated upon manually engaging and elevating the body and the container or carrying gear, with the load therein.

In those cases or instances where it is possible or desired that the scales be supported independently rather than manually, the upper end of the upper reaction portion 10 of the rod R is connected and supported from and below a suitable support structure by means of a hook, wire, rope or other structure engaged in or with the coupling part of the rod. Thereafter, the scales can be used in essentially the same manner as noted above.

In those instances where our scale is to be used to measure forces between two related objects, it is suitably tied or connected with and between the objects in alignment therewith by any desired and suitable coupling parts or means engaged with the coupling parts at the ends of the rod. With the objects in static condition and with free slack removed from within the connections between the scales and its related objects, the scales is nulled or zeroed out. Thereafter, the objects are released from their static relationship and the tensile forces directed through the scales, as a result of the dynamics between the objects, is accurately indicated.

It is to be noted and is believed to be apparent that the above noted uses of our new scales are but a limited few of the many different uses to which the scales can be put.

The most serious potential shortcoming we have found to exist in our new scales resides in its great sensitivity to temperature changes and resulting thermal expansion and contraction of the central portion 14 of the rod on which the gauges $G^1$ through $G^4$ are fixed. When the scales is moved from extremely hot environments into extremely cold environments or vice versa and is put to use before it has had time to warm or cool and become substantially thermally stable in its new environment, it is inherently thermally unstable. By establishing the housing structure H of a plastic material having a low index of thermal conductivity and by limiting the amount or extent that the upper and lower end portions of the rod project from the housing structure H and are exposed to the environment, the central portion of the rod is suitably thermally insulated and the quantity of heat conducted through the reaction and working portions of the rod to the central portion thereof is sufficiently reduced so that the rate of thermal expansion or contraction of the central portion of the rod is slowed to an extent that the problem of thermal instability is not a major problem. In the worst of anticipated operating conditions, upon zeroing out or nulling the scale, accurate and true reading can normally be attained before thermal instability has worked to result in the scales presenting a false reading.

The foregoing problem is a problem which must be considered and treated where time is limited and is of the essence. In most situations where extreme temperature changes are not encountered and/or when time is not of the essence, the scales can be let to warm or cool to the temperature of their environment before being put to use and the above eluded to problem of thermal instability is thereby eliminated.

In furtherance of the foregoing, we have found that if the housing is established of a metal or other material having a high index of thermal conductivity and the housing is engaged in the hand of the operator of the scales, sufficient heat is conducted from the user's hand into the housing and throughout the scales structure to result in adverse thermal instability. Accordingly, establishing the housing structure of a material having a low index of thermal conductivity and such that it thermally insulates the rod and other components and parts of our scales structure is highly important.

Having described only one typical preferred form and embodiment of our invention, we do not wish to be limited to the specific details herein set forth but wish to reserve to ourselves any modifications and/or variations that might appear to those skilled in the art and which fall within the scope of the follow claims.

Having described our invention, we claim:

1. A weighing scales comprising a normally laterally and torsionally stable elongate vertical load-supporting and force-conducting rod with an elongate upper reaction portion, an elongate lower working portion and an elongate central tension portion, said tension portion is less in cross-sectional extent than and extends between the reaction and working portions; a plurality of resistance-type strain gauges fixed to the tension portion in predetermined spaced relationship thereon and relative to each other; an elongate vertical housing with upper, central and lower portions is engaged about the rod between the upper and lower terminal end portions thereof; anchoring means secures the reaction portion of the rod in and with the upper end portion of the housing with the tension and working portions of the rod extending through and depending from the central and lower portions of the housing with free working clearances, a window opening in the housing; a circuit board mounted within the housing and carrying an electric digital display device visible through the window and a bridge circuit with a signal output connected with the digital display device and in which the strain gauges on the rod are connected, a variable resistance device with a manually engageable operating part accessible at the exterior of and carried by the housing and connected in the circuit and operating to selectively null an output signal from the circuit to the display device, a power supply battery mounted in the housing and connected with a power input of the circuit.

2. The weighing scales set forth in claim 1 wherein the upper and lower end portions of the rod project freely upwardly and downwardly from the upper and lower ends of the housing and have manually accessible coupling parts to couple with complimentary coupling parts to secure their related ends of the rod with and between structure between which forces to be measured are directed.

3. The weighing device set forth in claim 1 wherein the housing is made of a strong, durable material having a low index of thermal conductivity and the housing thermally insulates the tension portion and the portions of the reaction and working portions of the rod about which it occurs.

4. The weighing scales set forth in claim 1 wherein the upper and lower end portions of the rod project freely upwardly and downwardly from the upper and lower ends of the housing and have manually accessible coupling parts to couple with complimentary coupling parts to secure their related ends of the rod with and between structure between which forces to be measured are directed; the housing is made of a strong, durable material having a low index of thermal conductivity and the housing thermally insulates the tension portion and the portions of the reaction and working portions of the rod about which it occurs.

5. The weighing device set forth in claim 1 which further includes a manually operable on and off switch accessible at the exterior of and carried by the housing and connected with and between the circuit and the battery to stop and start the flow of current therebetween.

6. The weighing scales set forth in claim 1 wherein the upper and lower end portions of the rod project freely upwardly and downwardly from the upper and lower ends of the housing and have manually accessible coupling parts to couple with complimentary coupling parts to secure their related ends of the rod with and between structure between which forces to be measured are directed; the scales further includes a manually operable on and off switch accessible at the exterior of and carried by the housing and which is connected with and between the circuit and the battery to start and stop the flow of current therebetween.

7. The weighing device set forth in claim 1 wherein the housing is made of a strong, durable material having a low index of thermal conductivity and the housing thermally insulates the tension portion and the portions of the reaction and working portions of the rod about which it occurs; the scales further includes a manually operable on and off switch accessible at the exterior of and carried by the housing and which is connected with and between the circuit and the battery to start and stop the flow of current therebetween.

8. The weighing scales set forth in claim 1 wherein the upper and lower end portions of the rod project freely upwardly and downwardly from the upper and lower ends of the housing and have manually accessible coupling parts to couple with complimentary coupling parts to secure their related ends of the rod with and between structure between which forces to be measured are directed; the housing is made of a strong, durable material having a low index of thermal conductivity and the housing thermally insulates the tension portion and the portions of the reaction and working portions of the rod about which it occurs; the scales further includes a manually operable on and off switch accessible at the exterior of and carried by the housing and which is connected with and between the circuit and the battery to start and stop the flow of current therebetween.

9. The weighing scales set forth in claim 1 which further includes a signal lamp carried by and visible at the exterior of the housing and supplied with power from the battery by conductor lines and a normally open switch structure in one of said lines and positioned at and between the lower end of the housing and the working portion of the rod and which is closed when the lower portion of the rod is torsionally displaced and when the lower end portion of the rod is laterally displaced an extent sufficient to adversely distort the tension portion of the rod.

10. The weighing scales set forth in claim 1 wherein the upper and lower end portions of the rod project freely upwardly and downwardly from the upper and lower ends of the housing and have manually accessible coupling parts to couple with complimentary coupling parts to secure their related ends of the rod with and between structure between which forces to be measured are directed; the scales further includes a signal lamp carried by and visible at the exterior of the housing and supplied with power from the battery by conductor lines and a normally open switch structure in one of said lines and positioned at and between the lower end of the housing and the working portion of the rod and which is closed when the lower portion of the rod is torsionally displaced and when the lower end portion of the rod is laterally displaced an extent sufficient to adversely distort the tension portion of the rod.

11. The weighing device set forth in claim 1 wherein the housing is made of a strong, durable material having a low index of thermal conductivity and the housing thermally insulates the tension portion and the portions of the reaction and working portions of the rod about which it occurs; the scales further includes a signal lamp carried by and visible at the exterior of the housing and supplied with power from the battery by conductor lines and a normally open switch structure in one of said lines and positioned at and between the lower end of the housing and the working portion of the rod and which is closed when the lower portion of the rod is torsionally displaced and when the lower end portion of the rod is laterally displaced an extent sufficient to adversely distort the tension portion of the rod.

12. The weighing scales set forth in claim 1 wherein the upper and lower end portions of the rod project freely upwardly and downwardly from the upper and lower ends of the housing and have manually accessible coupling parts to couple with complimentary coupling parts to secure their related ends of the rod with and between structure between which forces to be measured are directed; the housing is made of a strong, durable material having a low index of thermal conductivity and the housing thermally insulates the tension portion and the portions of the reaction and working portions of the rod about which it occurs; the scales further includes a signal lamp carried by and visible at the exterior of the housing and supplied with power from the battery by conductor lines and a normally open switch structure in one of said lines and positioned at and between the lower end of the housing and the working portion of the rod and which is closed when the lower portion of the rod is torsionally displaced and when the lower end portion of the rod is laterally displaced an extent sufficient to adversely distort the tension portion of the rod.

13. The weighing device set forth in claim 1 which further includes a manually operable on and off switch accessible at the exterior of and carried by the housing and connected with and between the circuit and the battery to stop and start the flow of current therebetween; the scales further includes a signal lamp carried by and visible at the exterior of the housing and supplied with power from the battery by conductor lines and a normally open switch structure in one of said lines and positioned at and between the lower end of the housing and the working portion of the rod and which is closed when the lower portion of the rod is torsionally displaced and when the lower end portion of the rod is laterally displaced an extent sufficient to adversely distort the tension portion of the rod.

14. The weighing scales set forth in claim 1 wherein the upper and lower end portions of the rod project freely upwardly and downwardly from the upper and lower ends of the housing and have manually accessible coupling parts to couple with complimentary coupling parts to secure their related ends of the rod with and between structure between which forces to be measured are directed; the scales further includes a manually operable on and off switch accessible at the exterior of and carried by the housing and which is connected with and between the circuit and the battery to start and stop the flow of current therebetween; the scales further includes a signal lamp carried by and visible at the exterior of the housing and supplied with power from the battery by conductor lines and a normally open switch structure in one of said lines and positioned at and between the lower end of the housing and the working portion of the rod and which is closed when the lower portion of the rod is torsionally displaced and when the lower end portion of the rod is laterally displaced an extent sufficient to adversely distort the tension portion of the rod.

15. The weighing device set forth in claim 1 wherein the housing is made of a strong, durable material having a low index of thermal conductivity and the housing thermally insulates the tension portion and the portions of the reaction and working portions of the rod about which it occurs; the scales further includes a manually operable on and off switch accessible at the exterior of and carried by the housing and which is connected with and between the circuit and the battery to start and stop the flow of current therebetween; the scales further includes a signal lamp carried by and visible at the exterior of the housing and supplied with power from the battery by conductor lines and a normally open switch structure in one of said lines and positioned at and between the lower end of the housing and the working portion of the rod and which is closed when the lower portion of the rod is torsionally displaced and when the lower end portion of the rod is laterally displaced an extent sufficient to adversely distort the tension portion of the rod.

16. The weighing scales set forth in claim 1 wherein the upper and lower end portions of the rod project freely upwardly and downwardly from the upper and lower ends of the housing and have manually accessible coupling parts to couple with complimentary coupling parts to secure their related ends of the rod with and between structure between which forces to be measured are directed; the housing is made of a strong, durable material having a low index of thermal conductivity and the housing thermally insulates the tension portion and the portions of the reaction and working portions of the rod about which it occurs; the scales further includes a manually operable on and off switch accessible at the exterior of and carried by the housing and which is connected with and between the circuit and the battery to start and stop the flow of current therebetween; the scales further includes a signal lamp carried by and visible at the exterior of the housing and supplied with power from the battery by conductor lines and a normally open switch structure in one of said lines and positioned at and between the lower end of the housing and the working portion of the rod and which is closed when the lower portion of the rod is torsionally displaced and when the lower end portion of the rod is laterally displaced an extent sufficient to adversely distort the tension portion of the rod.

* * * * *